United States Patent [19]

Moore

[11] Patent Number: 4,884,179
[45] Date of Patent: Nov. 28, 1989

[54] LAMP WITH BUILT-IN ON-OFF SWITCH

[76] Inventor: Dennis G. Moore, 2602 Superior, Livermore, Calif. 94550

[21] Appl. No.: 206,283

[22] Filed: Jun. 14, 1988

[51] Int. Cl.[4] ............................................. F21V 23/00
[52] U.S. Cl. .................................... 362/295; 362/80; 362/74; 200/317
[58] Field of Search ...................... 362/61, 80, 74, 295, 362/95, 802, 394; 200/310, 317

[56] References Cited

U.S. PATENT DOCUMENTS

| | | | |
|---|---|---|---|
| 3,317,696 | 5/1967 | Sanchez | 200/317 |
| 3,899,669 | 8/1975 | Nathanson | 362/295 |
| 4,479,170 | 8/1984 | Richardson | 362/295 |
| 4,482,940 | 11/1984 | Brardherm | 362/295 |
| 4,536,829 | 8/1985 | Grimm et al. | 362/74 |
| 4,775,767 | 10/1988 | Sawada et al. | 200/310 |

FOREIGN PATENT DOCUMENTS 2039355 8/1980 United Kingdom ................ 362/295

Primary Examiner—Ira S. Lazarus
Assistant Examiner—D. M. Cox
Attorney, Agent, or Firm—Wall and Roehrig

[57] ABSTRACT

An all-purpose lamp for use with vehicles. The lamp includes an air impervious housing having a lens formed therein in optical alignment with a bulb carried within the housing. The housing is open at its lower end for receiving a bulb carrier which is movable relative to the housing. Movement of the bulb carrier controls the on-off operation of the lamp. In one embodiment this switching function is effected by operation of a slide supported on the lamp housing and engaging the bulb carrier. Movement of the slide relative to the lamp housing will effect a corresponding movement of the bulb carriage, thereby moving the bulb in to and out from engagement with a pair of electrical contacts supported within the upper portion of the lamp housing. In this manner, illumination of the lamp is controlled by moving the slide to effect a corresponding movement of the bulb carrier into engagement with the electrical contacts coupled to the vehicle power supply. Movement of the slide in the opposite direction and, therefore, the bulb carrier relative to the lamp housing, will physically separate the bulb from the energizing contacts thereby terminating illumination.

17 Claims, 1 Drawing Sheet

LAMP WITH BUILT-IN ON-OFF SWITCH

BACKGROUND OF THE INVENTION

This invention relates in general to vehicle lighting and, in particular, to an auxiliary lamp for use with boats, trailers, recreational vehicles, trucks, automobiles or the like.

More specifically, but without restriction to the particular embodiment and/or use which is shown and described for purposes of illustration, this invention relates to an all purpose auxiliary lamp having a built-in "on-off" switch which permits the ready replacement of burned-out bulbs without requiring the use of any tools.

Auxiliary lamps are used on boats, trailers, recreational vehicles, trucks and automobiles, for examples, to comply with government lighting regulations, for decorative purposes, and as a convenience item to provide light in such areas as the trunk, closets, storage spaces or to facilitate working on or around the vehicle at night. Some of such lighting is of a portable nature, for example a spotlight which may be connected to the vehicle power supply by means of an adaptor which plugs into a cigarette lighter permitting the lamp to be used about the vehicle by means of an attached cord. Other such lights, for example courtesy lights, are attached to the vehicle and illuminated by means of a switch connected into the lamp circuit. These lamps may be actuated manually and/or automatically by the opening or closing of a door acting on a switch coupled into the illuminating circuit. Such courtesy lights are generally designed into the vehicle as original equipment, and are placed by the vehicle manufacturer according to the vehicle specifications.

The instant invention provides an all-purpose lamp which eliminates the necessity for a separate control switch in the illuminating circuit by incorporating the switching function into the lamp structure itself. The lamp is designed such that movement of a portion of the lamp controls illumination. In this manner the contacts of the illuminating bulb incorporated into the lamp are self-cleaning, eliminating problems associated with contact corrosion and the accumulation of dust, dirt or debris which can insulate the bulb contact from effecting a proper electrical connection with the vehicle power supply. The all-purpose lamp construction permits the illuminating bulb to be readily replaced, when necessary, without requiring the use of any tools.

One application for the invention is its use as a clearance or I.D. identification lamp. Because a burned-out lamp can be so readily replaced, once the lamp has been mounted, for example high up on a truck trailer or recreational vehicle, a simple tool or a bent coat hanger can be used to operate the lamp or to replace burned-out bulbs in a manner hereinafter described in detail. The ability of the lamps to function in that manner, eliminates the need for using a ladder to replace bulbs and permits the selective illumination of one or more of the lamps as desired or required by motor vehicle laws.

Another application for the lamp of this invention is use in display panels wherein lamps are mounted in a grid pattern and selectively illuminated to display information. The ease with which burned-out bulbs may be readily replaced, especially eliminating the need for hand tools or ladders to effect replacement, greatly enhances user convenience and improves user safety by the use of these lamps for work purposes.

The construction of the lamp with the actuator portion moving the bulb in to and out from contact with the energizing contacts of the vehicle power supply not only eliminates the necessity of a separate actuating switch, but permits the lamp to be positioned to be automatically turned on or off by the opening and/or closing of a door. This feature is especially useful in, for example, recreational vehicles or boats wherein the closing of a closet, cabinet or storage area door can automatically turn off the light preventing accidental drain or discharge of the vehicle battery.

SUMMARY OF THE INVENTION

It is, therefore, an object of this invention to improve auxiliary lamps for vehicles.

Another object of this invention is to eliminate the necessity of a separate actuating switch for controlling the illumination of an auxiliary lamp.

A further object of this invention is to incorporate the switching function of an auxiliary lamp into the lamp structure.

Still another object of this invention is to incorporate the switching function of an auxiliary vehicle lamp into the lamp structure such that the physical positioning of the lamp may be utilized to automatically control the switching operation.

Yet another object of this invention is to insure the electrical integrity of an auxiliary lamp by eliminating lamp failure due to corroded electrical contacts.

These and other objects are attained in accordance with the present invention wherein there is provided an all-purpose lamp for use with vehicles. The lamp includes an air impervious housing having a lens formed therein in optical alignment with a bulb carried within the housing. The housing is open at its lower end for receiving a bulb carrier which is movable relative to the housing. Movement of the bulb carrier controls the on-off operation of the lamp. In one embodiment this switching function is effected by operation of a slide supported on the lamp housing and engaging the bulb carrier. Movement of the slide relative to the lamp housing will effect a corresponding movement of the bulb carriage, thereby moving the bulb in to and out from engagement with a pair of electrical contacts supported within the upper portion of the lamp housing. In this manner, illumination of the lamp is controlled by moving the slide to effect a corresponding movement of the bulb carrier into engagement with the electrical contacts coupled to the vehicle power supply. Movement of the slide in the opposite direction and, therefore, the bulb carrier relative to the lamp housing, will physically separate the bulb from the energizing contacts thereby terminating illumination.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout wherein.

DESCRIPTION OF A PREFERRED EMBODIMENT

Figure 1:
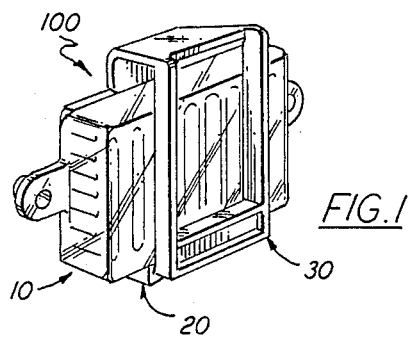
FIG. 1 is a frontal perspective view of an auxiliary vehicle lamp constructed in accordance with the present invention.

Referring now to FIG. 1, there is illustrated an all-purpose auxiliary lamp 100 for use with vehicles. The lamp 100 includes a housing portion 10 formed from an air impervious material, with the bottom of the housing 10 having an opening 10a therein to permit the insertion of a bulb carrier 20 which is movable in to and out of the lamp housing 10 under the control of the movement of an actuator slide 30 illustrated in FIG. 1 in its uppermost position. For convenience of illustration, the orientation of the lamp 100 will be described in the manner one would view the lamp in use. Therefore, the portion of the lamp which is observed is referred to as a front wall 11 and the light is directed outwardly therethrough. While the actuator slide 30 is illustrated in its uppermost or extended position relative to the lamp housing 10, for reasons discussed in detail hereinafter, the lamp, in use, may be oriented differently. For example, the lamp 100 could be rotated 90 degrees, and in that event the slide 30 will have a horizontal orientation. In that event, the positioning of slide 30 illustrated in FIG. 1 would be referred to as being in an extended position rather than an uppermost position as the orientation of the slide would be in a horizontal direction. However, for convenience of illustration, the lamp 100 is shown in an orientation wherein the movement of the slide 30 is in a vertical direction.

The lamp housing 10, also shown in detail in the remaining drawings, includes a unitary body of transparent plastic material, preferably made from LEXAN ™, a registered trademark of the General Electric Company for an impact resistant plastic material. This plastic material may be clear or colored depending upon the particular use or application of the lamp. The housing is formed as a unitary air impervious plastic enclosure with the opening 10a in the lower portion or bottom of the housing 10. In this manner, the housing 10 will define an air chamber having a sufficient volume so that if the lamp 100 is submerged in water, such as if the lamp is used on a boat trailer, a limited amount of water will enter the bottom of the housing 10 through the opening 10a and the air will be trapped and compressed therein creating a force sufficient to prevent the water from rising above a predetermined level. Lamps incorporating such a water proof feature are disclosed in U.S. Pat. No. 3,106,349 and the inventor's prior U.S. Pat. Nos. 3,858,039; 4,281,367 and 4,506,314. While the present lamp is not intended to be limited in its applications to boat trailers, the presence of this air-trapping feature of the lamp 100 makes the lamp especially suitable for such use.

The lamp housing 10 includes the front wall 11 to which a top wall 12 and side walls 13 are integrally formed with a back wall 14 joined to the rear edges of the top wall and side walls to form the air-impervious housing. Each of the side walls 13 is formed with an ear portion 13a having a preformed hole which is used in combination with a fastening device, such as a screw, to fasten the lamp 100 in a desired mounting or orientation.

Figure 6:
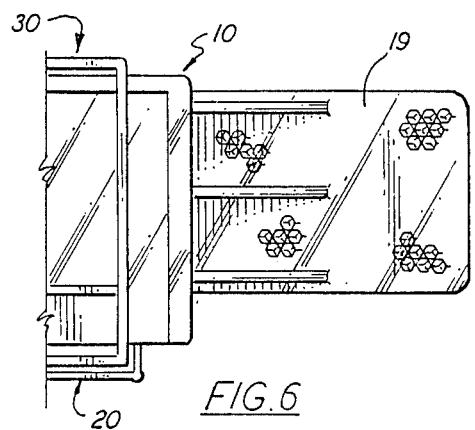
FIG. 6 is a partial frontal planar view of a modification to the lamp shown in FIGS. 1–5.

The ear 13a has an extended portion 13b which extends outwardly to the rear a sufficient distance to assist in providing a stable mounting of the lamp 100 onto a surface to which the lamp is mounted. The rear wall 14 also includes a pair of stand-off pads 14b which function to assist in stabilizing the mounting of the lamp 100. If desired, as illustrated in FIG. 6, a reflector surface or panel 19 can be formed or secured to the side walls 13 to extend outwardly as a wing wall for those applications where such a reflective surface is desired or necessary.

Figure 3:
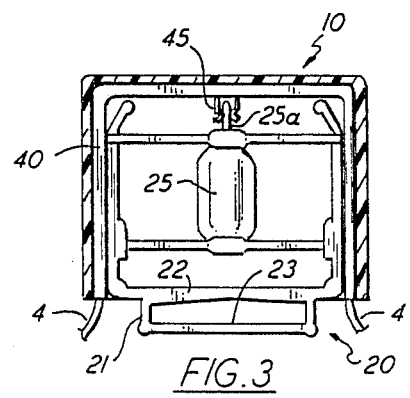
FIG. 3 is a frontal planar view of the lamp with portions broken away and the actuator slide removed to better illustrate the construction thereof.
Figure 2:
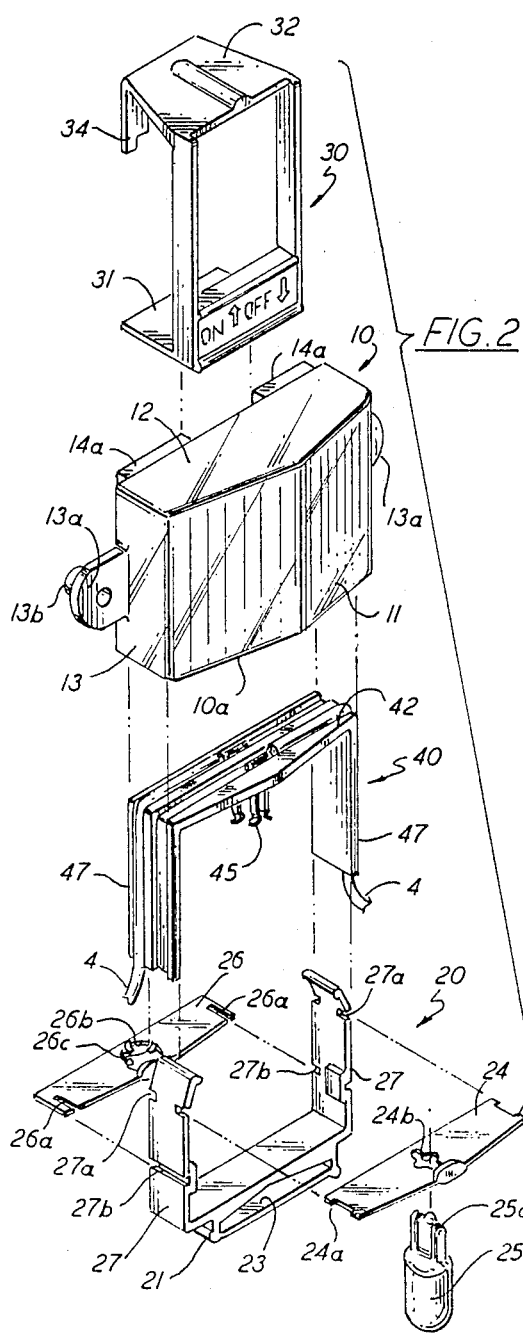
FIG. 2 is a exploded view of the lamp shown in FIG. 1 to better illustrate the components thereof.
Figure 4:
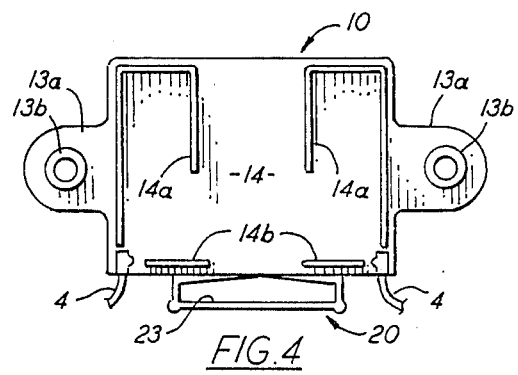
FIG. 4 is a rear planar view of the lamp illustrated in FIG. 3.
Figures 5, 7:
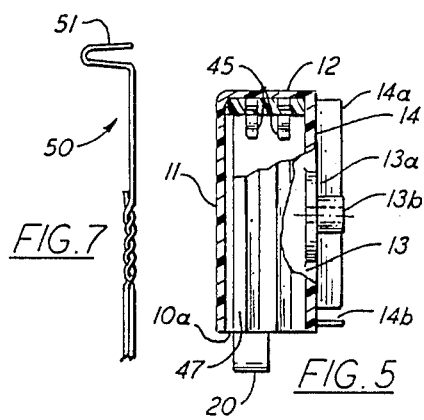
FIG. 5 is a side planar view of the lamp illustrated in FIG. 3.
FIG. 7 is a perspective view of a tool for engaging the bulb carrier.

Referring primarily to FIG. 2, 3 and 5, a light bulb or lamp 25, preferably of the type referred to as having a non-metallic or wedge type base, is positioned and carried within the housing 10 by the bulb carrier 20. The bulb carrier 20 comprises a frame formed in a substantially U-shaped configuration with a handle or gripping portion 21 affixed to the bottom or base 22 of the U-shaped frame. The handle portion 21 is spaced from the base 22 forming an opening 23 into which a portion of the actuator slide 30, or a hook portion 51 of a tool 50 as shown in FIG. 7, may be inserted to move the bulb carrier 20 in to and out from a position wherein the bulb 25 carried therein will be engaged with or removed from engagement with electrical contacts 45 carried within the lamp housing 10 for coupling the bulb 25 to the vehicle power supply.

To position the bulb 25 for movement into engagement with the electrical contacts 45, two bridges 24 and 26 span the distance between the parallel legs 27 of the U-shaped bulb carrier 20. The upper bridge 24 has the ends thereof each formed with a pair of tab portions 24a which are engageable with a pair of complementary notches 27a formed near the free end of each of the parallel legs 27 of the U-shaped bulb carrier to position the base of the bulb in a proper orientation. A slot 24b is formed transversely across the width of the upper bridge 24 to receive therethrough the base of the bulb 25 such that the base extends upwardly or outwardly from the upper bridge 24 exposing the electrical contacts 25a of the bulb 25 to facilitate engagement with electrical contacts 45 carried within the housing 10 adjacent to the upper wall 13 in a manner to be hereinafter described in detail.

The lower bridge 26 is formed with a slot 26a in each end to engage a complementary slot 27b formed in a lower portion of each one of the two parallel legs 27 of the U-shaped bulb carrier 20. The central portion of the lower bridge 26 is formed with a hole 26b therein having four inwardly extending boss or tang portions 26c which are circumferentially spaced an equal distance about the hole 26b to engage and support the tip or globe end of the bulb 25 in a proper orientation. When the bulb carrier 20 has been removed entirely from the housing 10, the upper bridge 24 can be quickly and conveniently snapped free of the U-shaped carrier 20 by merely flexing the free ends of legs 27 outwardly away from one another permitting rapid and easy replacement of a burned-out bulb 25.

The electrical contacts 45 into which the bulb 25 is inserted for completing an electrical circuit energizing the bulb, are carried on a U-shaped contact frame 40 which in the embodiment disclosed is formed of a plastic electrically insulating material. As best illustrated in FIG. 3, the width or bight of the contact frame 40 is greater than the width or bight of the bulb carrier 20 so that the bulb carrier 20 is positionable within the bight of the contact carrier 40. The base portion 42 of the contact carrier carries a pair of electrically isolated contacts which form the electrical contacts with which the bulb 25 is connected into the vehicle electrical illuminating circuit.

The contact carrier 40 is formed such that the width of both leg portions 47 and the base portion 42 is separated into two channels for separately receiving therein one of a pair of wire leads 4 for connecting the lamp to the vehicle power supply. One electrical lead wire 4 is carried in each one of the grooves so that the lead wires 4 are electrically isolated one from another. One end of each of the lead wires 4 is soldered to one of the contacts 45, with which the terminals 25a of the bulb 25 are to be engaged, with the contacts 45 extending inwardly from the base portion 42 toward the interior of the contact carrier 40 to be engaged by the contacts 25a of the bulb 25 to connect the bulb to an electrical power supply.

The contact carrier 40, bearing the secured lead wires 4, is positioned within the housing 10 and forms a channel which is defined in part between the interior surface of the housing side walls 13 and the exterior surface of the contact carrier legs 47. The lead wires 4, carried on the contact carrier 40, extend along the contact carrier base 42 and downwardly along the channels.

To turn the lamp 100 on or off, the actuator slide 30, best illustrated in FIGS. 1 and 2, is carried on the lamp housing 10 with a leg portion 31 extending through the opening 23 of the bulb carrier 20 so that movement of the slide 30 relative to the lamp housing 10 will cause or effect a corresponding movement of the bulb carrier 20 relative to the interior of the lamp housing 10 and the electrical contacts 45 extending inwardly on the interior thereof. An upper portion 32 of the slide, opposite to the leg 31, extends across the top wall 12 of the lamp housing 10 and has a portion 34 depending downwardly therefrom which engages a pair of guides 14a formed on the back of the rear wall 14 of the lamp housing. In this manner, the movement of the actuator slide 30 is constrained in a predetermined manner between limits determined by the relationship between the length or height of the actuator slide 30 relative to the lamp housing 10. This movement is to be sufficient to move the bulb carrier 20, and thereby the contacts 25a of bulb 25, in to and out from engagement with the electrical contacts 24, in accordance with the positioning of the slide 30 relative to the lamp housing, thereby turning the lamp on or off by the physical positioning of the bulb 25.

While the embodiment disclosed utilizes the actuator slide 30 to move the bulb carrier in to and out from a position wherein the bulb 25 engages the contacts 45, it is to be understood that the lamp 100 can be operated with the actuator slide 30 removed, by manually positioning the bulb carrier 20 with the users fingers grasping the handle portion 21, or by the use of the reaching tool 50, or the like. As best shown in FIG. 7, a suitable tool 50 can be formed from an ordinary coat hanger by bending and squeezing the hanger hook portion 51 so that it will fit into the opening 23 of the bulb carrier 20. If a longer reach is required, such as to reach the top portion of a semitrailer, such a hook can be fashioned on a pole of sufficient length.

In the event of a bulb burnout, access to the bulb can be conveniently effected by merely pulling the leg portion 31 of the slide 30 out from engagement with the opening 23 in the bulb carrier 20 in which it has been engaged, and then pulling the bulb carrier out from the housing interior. The lamp 25 can be conveniently replaced by merely unsnapping the top bridge 24 and replacing the burned-out bulb with a new one. The bulb carrier 20 is then inserted into the lamp housing 10 into engagement with the electrical contacts 45 which insure that the replacement bulb is in proper working order. The leg portion 31 of the slide 30 is then merely snapped into the opening 23 from which it had been previously removed. The lamp 100 is now in proper working order, and will be turned on or off in accordance with the positioning of the slide 30 relative to the lamp housing, by manually pushing/pulling the bulb carrier through the gripping portion 21 as described above, or by the use of the hook 51 being inserted into the opening 23 and the bulb carrier raised until it is pushed into the lamp housing 10, when the housing is fixed in a high place.

The construction of the lamp 100 in the manner described permits the lamp to be positioned, for example, in a cabinet or closet with the leads 4 connected to the power supply of a vehicle and with the slide 30 positioned adjacent to the closet door. When the door is opened, the slide 30 can be pulled manually or pushed to turn the light on, or a hook may be positioned on the door so that opening of the door will engage the slide pulling the slide upwardly or outwardly relative to the lamp housing turning the light on. When the door is then closed, the door contacting the extended slide 30 will force the slide to be moved downwardly or inwardly relative to the lamp housing, thereby moving the terminal 25a on the lamp base out from contact with the terminals 45 turning the light off. If it would be desired to effect an opposite operation of the lamp, the lamp has only to be rotated 180 degrees so that opening of the door would turn the lamp off, and closing of the door would turn the lamp on if desired.

While the invention has been described in the specification and illustrated in the drawings with reference to a preferred embodiment, it will be understood by those skilled in the art that various changes may be made and equivalents may be substituted for elements of the invention without departing from the scope of the claims or the equivalency of the invention. In addition, many modifications may be made to adapt a particular situation or material to the teachings of the invention without departing from the essential scope thereof or its equivalent. Therefore, it is intended that the invention not be limited to the particular embodiment illustrated by the drawings and described in the specification as the best mode presently contemplated for carrying out this invention, but that the invention will include any embodiments falling within the description of the appended claims or the equivalent thereof.

What is claimed is:

1. An electric lamp for use in a vehicle lighting system comprising
    a housing having a light transmitting portion through which light is passed when a light bulb positioned therein is illuminated,
    said housing having an opening for receiving therethrough a light bulb carrier means for supporting a light bulb in a predetermined position when said light bulb carrier means is positioned therein, a light bulb carrier means for retaining a light bulb in a position such that an electrical coupling portion of the light bulb extends outwardly from said light bulb carrier means for engagement with an electrical contact means to couple therethrough a source of illuminating energy for the light bulb, electrical contact means supported in said housing in a position to be engaged by the electrical coupling portion of a light bulb retained in said light bulb carrier means such that movement of said light bulb carrier means positions the light bulb retained therein in to and out from engagement with said electrical contact means to thereby illuminate and extinguish the light bulb, and actuator slide means carried by said housing and movable relative thereto for effecting the opening and closing of an illuminating circuit for illuminating a light bulb positioned in said light bulb carrier means, said actuator slide means positioned by said housing to engage said light bulb carrier means for effecting movement thereof in response to movement of said actuator slide means to thereby move a light bulb retained in said light bulb carrier means in to and out from engagement with said electrical contact means for selectively coupling the light bulb to a source of electric power.

2. The electric lamp of claim 1 further including means for securing said lamp to a supporting surface.

3. The electric lamp of claim 2 further including stabilizing means for stabilizing said housing relative to a supporting surface upon which said lamp is secured.

4. An electric lamp for use in a vehicle lighting system comprising a housing having a light transmitting portion through which light is passed when a light bulb positioned therein is illuminated, said housing having an opening for receiving therethrough a light bulb carrier means for supporting a light bulb in a predetermined position when said light bulb carrier means is positioned therein, a light bulb carrier means for retaining a light bulb in a position such that an electrical coupling portion of the light bulb extends outwardly from said light bulb carrier means for engagement with an electrical contact means to couple therethrough a source of illuminating energy for the light bulb, said light bulb carrier means including handle means supported therefrom which extends outwardly from said housing when said light bulb carrier means is positioned for engagement therewithin to effect movement of said light bulb carrier means for coupling the light bulb to a source of electric power, and electrical contact means supported in said housing in a position to be engaged by the electrical coupling portion of a light bulb retained in said light bulb carrier means such that movement of said light bulb carrier means positions the light bulb retained therein in to and out from engagement with said electrical contact means to thereby illuminate and extinguish the light bulb.

5. The electric lamp of claim 4 wherein said light bulb carrier means includes a pair of parallel-spaced slide members extending from a common base member positionable within said housing, a light bulb base receiving cross member extending between and supported from a free end of each one of said parallel-spaced slide members, said light bulb base receiving cross member having a slot formed therein through which a base portion of a light bulb is positionable such that the base portion extends outwardly from said light bulb carrier for engagement with said electrical contact means supported in said housing.

6. The electrical lamp of claim 5 further including a light bulb globe receiving cross member extending between and supported from said parallely spaced slide members at a position between said light bulb base receiving cross member and said common base member, said light bulb globe receiving cross member being formed with an opening therein for receiving a portion of the light bulb globe therein to position the light bulb within said light bulb carrier.

7. The electric lamp of claim 4 wherein said handle means defines an opening having a close perimeter to receive therein means for effecting movement of said light bulb carrier means.

8. The electric lamp of claim 7 further including actuator slide means carried upon said housing and movable relative thereto for effecting the movement of said light bulb carrier means, said actuator slide means being positioned upon said housing such that a portion thereof extends through said handle means opening for effecting movement of said light bulb carrier means in response to movement of said actuator slide means for coupling the light bulb to the source of electric power.

9. The electric lamp of claim 4 further including means for securing said lamp to a supporting surface.

10. The electric lamp of claim 9 further including stabilizing means for stabilizing said housing relative to a supporting surface upon which said lamp is secured.

11. An electric lamp for use in a vehicle lighting system comprising a housing having a light transmitting portion through which light is passed when a light bulb positioned therein is illuminated, said housing having an opening for receiving therethrough a light bulb carrier means for supporting a light bulb in a predetermined position when said light bulb carrier means is positioned therein, a light bulb carrier means for retaining a light bulb in a position such that an electrical coupling portion of the light bulb extends outwardly from said light bulb carrier means for engagement with an electrical contact means to couple therethrough a source of illuminating energy for the light bulb, and electrical contact means supported in said housing in a position to be engaged by the electrical coupling portion of a light bulb retained in said light bulb carrier means such that movement of said light bulb carrier means positions the light bulb retained therein in to and out from engagement with said electrical contact means to thereby illuminate and extinguish the light bulb, said electrical contact means being supported for positioning in said housing by a U-shaped frame positionable within said housing and having a width between the parallel legs of said U-shaped frame exceeding the width between the parallel slide members of said light bulb carrier means so that said light bulb carrier means is positionable within said U-shaped frame.

12. The electric lamp of claim 11 wherein the open portion of said U-shaped frame is adjacent to said opening in said housing.

13. The electric lamp of claim 11 further including means for securing said lamp to a supporting surface.

14. The electric lamp of claim 13 further including stabilizing means for stabilizing said housing relative to a supporting surface upon which said lamp is secured.

15. An electric lamp for use in a vehicle lighting system comprising a housing having a light transmitting portion through which light is passed when a light bulb positioned therein is illuminated, said housing having an opening for receiving therethrough a light bulb carrier means for supporting a light bulb in a predetermined position when said light bulb carrier means is positioned therein, a light bulb carrier means for retaining a light bulb in a position such that an electrical coupling portion of the light bulb extends outwardly from said light bulb carrier means for engagement with an electrical contact means to couple therethrough a source of illuminating energy for the light bulb, electrical contact means supported in said housing in a position to be engaged by the electrical coupling portion of a light bulb retained in said light bulb carrier means such that movement of said light bulb carrier means positions the light bulb retained therein in to and out from engagement with said electrical contact means to thereby illuminate and extinguish the light bulb, and light reflecting means positioned adjacent to said housing for reflecting light directed thereon.

16. The electric lamp of claim 15 further including means for securing said lamp to a supporting surface.

17. The electric lamp of claim 16 further including stabilizing means for stabilizing said housing relative to a supporting surface upon which said lamp is secured.

* * * * *